United States Patent Office 3,795,739
Patented Mar. 5, 1974

3,795,739
TREATMENT OF PARKINSON DISEASE
Walter Birkmayer and Erwin Neumayer, Vienna, Austria, assignors to Hoffmann-La Roche Inc., Nutley, N.J.
No Drawing. Filed Feb. 6, 1973, Ser. No. 329,986
Claims priority, application Switzerland, Feb. 15, 1972, 2,073/72
Int. Cl. A61k 27/00
U.S. Cl. 424—274      14 Claims

ABSTRACT OF THE DISCLOSURE

Pharmaceutical compositions for treating Parkinson disease which contain as the active anti-Parkinsonism ingredient, L-3-(3,4-dihydroxyphenyl)-alanine (L-dopa) or a pharmaceutically acceptable salt thereof in a mixture with L-tryptophan or a pharmaceutically acceptable salt thereof or L-5-hydroxytryptophan or a pharmaceutically acceptable salt thereof, and as an optional ingredient, a peripheral decarboxylase inhibitor are described. The compositions are useful for the treatment of Parkinson's disease with little or none of the side-effects usually associated with the use of L-dopa itself or in combination with a decaboxylase inhibitor.

BACKGROUND OF THE INVENTION

L-dopa alone or in combination with a peripheral decarboxylase inhibitor is used for the treatment of Parkinson's disease and is particulary effective against idiopathic Parkinson's disease. While L-dopa therapy has been of great benefit to many victims of Parkinson's disease, its use has been associated with undesirable side-effects which are mainly of the following three types:

1. Autonomic: Insomnia, fainting fits, cardiovascular disorders, vertigo, vomiting, loss of appetite and constipation.
2. Motoric: In the course of prolonged administration of high doses of L-dopa dyskinesiae of a choreotic or athetoid character occur. Tonic cramps in the lower extremities also hinder active mobility.
3. Psychic: Psychoses consisting of a transit syndrome with limitation of consciousnes, delirious confusion, motoric unrest, acoustic and optic hallucinations, delusions, a mood involving anxiety and disorientation regarding time and place are observed. Complete amnesia of this phase occurs once it is brought under control.

While side effects of autonomic and motoric types allow continuation of the L-dopa therapy, it has been, prior to this invention, necessary to discontinue L-dopa therapy when psychotic side effects appeared causing akinesia to progress again. There is thus a need for a therapeutic agent effective against Parkinson's disease which does not cause the undesirable side effects associated with L-dopa.

SUMMARY OF THE INVENTION

The present invention provides methods for treating Parkinson's disease and pharmaceutical compositions useful in such methods.

The invention is carried out by administering orally or parenterally L-dopa or a pharmaceutically acceptable salt thereof in combination with either L-tryptophan or L-hydroxytryptophan or a pharmaceutically acceptable salt of either or the combination together with a peripheral decarboxylase inhibitor.

DETAILED DESCRIPTION OF THE INVENTION

It has been found that on oral or parenteral administration to patients having Parkinson's disease, particularly those with idiopathic Parkinson's disease, of a pharmaceutical preparation containing as the active ingredient L-dopa or a pharmaceutically acceptable salt thereof in combination with L-tryptophan or L-5-hydroxytryptophan or a pharmaceutically acceptable salt of either, the typical symptoms of the disease such as rigor, akinesia, and tremor can be significantly improved or abolished without the simultaneous occurrence of undesirable side effects. Furthermore, it has been found that the treatment of the psychotic side effects of L-dopa with L-tryptophan or L-5-hydroxytryptophan or a pharmaceutically acceptable salt of either has considerable practical significance since the L-tryptophan or L-5-hydroxytryptophan or pharmaceutically acceptable salt of either not only causes the psychotic transit phase to disappear, but can be continued in combination with the administration of L-dopa or a pharmaceutically acceptable salt thereof without reappearance of psychotic side effects.

As used herein, the expression "pharmaceutically acceptable salts" means salts with pharmaceutically acceptable acids or bases, e.g., acids such as sulfuric, hydrochloric, nitric, phosphoric acid etc. or bases such as alkali or alkaline earth metal hydroxides, etc. The expression "active ingredient" as used herein means L-dopa or the equivalent amount of a pharmaceutically acceptable salt thereof. The expression "peripheral decarboxylase inhibitor" includes the compounds described herein or the equivalent amount of a pharmaceutically acceptable salt thereof. The expression "tryptophan compound" as used herein means L-tryptophan or L-5-hydroxytryptophan or the equivalent amount of a pharmaceutically acceptable salt of either.

It has been found that the benefits resulting from this invention can be obtained when using a peripheral decarboxylase inhibitor in combination with the active ingredient and the tryptophan compound to treat Parkinsonism. This is advantageous since it permits the utilization of less L-dopa per dosage to achieve the same effect.

Typical suitable peripheral decarboxylase inhibitors which are useful in this invention are those represented by the formula

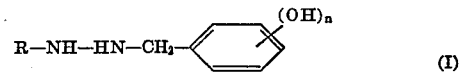
(I)

wherein R is hydrogen, amino-lower alkanoyl or hydroxy-, phenyl- or hydroxyphenylsubstituted amino-lower alkanoyl and $n$ is 2 or 3, and pharmaceutically acceptable salts thereof.

"Lower alkanoyl" as used herein includes branched and straight chain alkanoyl groups, containing from 2 to 7 carbon atoms inclusive.

Compounds within the scope of those represented by Formula I which are preferred for use in this invention are $N^1$-D,L-seryl-$N^2$-(2,3,4-trihydroxybenzyl)-hydrazide;
$N^1$-L-seryl-$N^2$-(2,3,4-trihydroxybenzyl)-hydrazide;
$N^1$-glycyl-$N^2$-(2,3,4-trihydroxybenzyl)-hydrazide;
$N^1$-D,L-tyrosyl-$N^2$-(2,3,4-trihydroxybenzl)-hydrazide and
$N^1$-L-tyrosyl-$N^2$-(2,3,4-trihydroxybenzyl)-hydrazide and pharmaceutically acceptable salts thereof.

Other typical suitable peripheral decarboxylase inhibitors are, for example, benzylideneacetophenone, L-3-(3,4-dihydroxyphenyl)-2-methylalanine and compounds represented by the formula

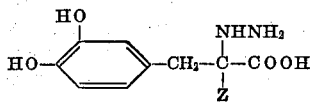

wherein Z is hydrogen or lower alkyl.

"Lower alkyl" as used herein includes branched or straight chain alkyl groups containing from 1 to 7 carbon atoms inclusive.

The invention is carried out by administering the compositions either orally or parenterally. The preferred oral dosage form is a solid form e.g. tablets and capsules, with tablets preferred. The preferred parental form is intravenous injection.

The pharmaceutical compositions of this invention can also contain as an optional ingredient one or more peripheral decarboxylase inhibitors in order to decrease the amount of L-dopa to be administered. As a peripheral decarboxylase inhibitor there can be used any pharmaceutically acceptable substance which inhibits the decarboxylase in the extracerebral organs and thereby inhibits the decarboxylation of the active ingredient, L-dopa, in these organs. However, those listed above are preferred.

The manner in which the various dosage i.e., administration forms, which are used in the practice of this invention are prepared will be readily apparent to persons skilled in the art. Standard techniques and procedures and conventional excipients and adjuvants are utilized in their production. In formulating the dosage forms, L-dopa and the tryptophan compound in combination or with a decarboxylase inhibitor can be admixed with inert adjuvants and excipients, either organic or inorganic in nature. Such adjuvants and excipients include, for example, water; gelatin; lactose; dicalciumphosphate; starch; stearic acid; calcium stearate; magnesium stearate; talc; vegetable oils such as aracous oil; polyalkylene glycol; preservatives; stabilizers; etc. Mixtures of the active ingredient with such excipients and adjuvants can be compressed, for example into tablets, dragees, etc. or they can be filled into suitable capsules. By using appropriate liquid vehicles, suspensions, emulsions or solutions for parenteral administration can be produced.

The compositions according to the invention contain from about 0.5 to 5 parts by weight, preferably about 1 to 3 parts by weight of L-tryptophan or L-5-hydroxytryptophan or an equivalent amount of a pharmaceutically acceptable salt of either per part by weight of L-dopa or an equivalent amount of a pharmaceutically acceptable salt thereof. Exemplary of a preferred weight ratio is 2 to 1. Typical unit dosage forms contain 100 mg. of active ingredient and 250 mg. of tryptophan compound.

If the pharmaceutical composition contains a decarboxylase inhibitor, it can be admixed with the active ingredient—tryptophan compound combination in a unit dosage form or the dosage form can be manufactured by incorporating the composition with a carrier material to form a core, providing this with a coating which is resistant to gastric juice causing slow release and applying an external layer which contains a peripheral decarboxylase inhibitor. In this latter manner there is obtained a pharmaceutical composition from which the active ingredient is released after the decarboxylase inhibitor has been released, preferably about 30 to 60 minutes afterwards. This type of pharmaceutical composition has been found to be particularly expedient. In the case of parenteral administration, the decarboxylase inhibitor is first administered, preferably intravenously, and the active ingredient is administered about 30 to 60 minutes later. In the cases in which the compositions of this invention contain a decarboxylase inhibitor the weight ratio of the active ingredient to the decarboxylase inhibitor is preferably between 1 to 10 parts of active ingredient per part of decarboxylase inhibitor. The preferred weight ratio between the tryptophan compound, the active ingredient and decarboxylase inhibitor are about 10 to 30 parts of tryptophan compound, 2.5 to 7.5 parts of active ingredient and 0.5 to 2.5 parts of a decarboxylase inhibitor. The preferred weight ratio is 20 to 5 to 1. Typical unit dosage forms contain 250–300 mg. of tryptophan compound 100–40 mg. of active ingredient and 25–10 mg. of decarboxylase inhibitor.

The amount of L-dopa or salt thereof administered per day is governed by the needs of the particular case and the judgment of the clinician. In general, in the case of oral administration, an amount of L-dopa from about 0.1 to about 4 grams, preferably about 1.5 to about 3 grams is administered per day. With intravenous application, the amount of L-dopa administered per day is generally between 10 milligrams and about 2 grams, preferably about 1 gram.

As stated, the amount of active ingredient, i.e. L-dopa or equivalent amount of a pharmaceutically acceptable salt thereof, administered can be lowered by administrating it in combination with a peripheral decarboxylase inhibitor. Generally it has been found that requirements of active ingredient when combined therapy is used, particularly in the case of oral administration are reduced to the lower part of the ranges mentioned above. For example, there can be administered orally per day one gram of L-dopa and a hundred milligrams of decarboxylase inhibitor or 500 milligrams of L-dopa and 500 milligrams of decarboxylase inhibitor. The amount of tryptophan compound used in the case of administration of the active ingredient in combination with a decarboxylase inhibitor is within the ranges stated previously.

It is most expedient to administer the daily requirements of the drugs in equally divided doses over the course of the day. Such doses are determined by the clinician according to the needs in each case.

The L-tryptophan or L-5-hydroxytryptophan and the L-dopa as well as the optionally present decarboxylase inhibitor need not be administered simultaneously but can be administered separately. The undesirable side effects which occur when L-dopa is used alone or in combination with a decarboxylase inhibitor can be treated by separate administration of the tryptophan compound, i.e., L-tryptophan L - 5 - hydroxytryptophan or a pharmaceutically acceptable salt of either, resulting in a reduction or removal of the side effects. The following examples illustrate the invention.

EXAMPLE 1

250 parts of L-tryptophan, 100 parts of L-3-(3,4-dihydroxyphenyl)-alanine and 100 parts of mannitol are mixed until homogenous then sieved. The resulting powder mixture is well moistened with 300 parts of a 10% maize starch glue and subsequently granulated, dried and sieved once again. The resulting granulate is mixed with 3 parts of magnesium stearate and 17 parts of talcum. The mixture is then filled into number 0 capsules. Each capsule has the following composition:

| | Mg. |
|---|---|
| L-Tryptophan | 250 |
| L-3-(3,4-dihydroxyphenyl)-alanine | 100 |
| Mannitol | 100 |
| Maize starch | 30 |
| Magnesium stearate | 3 |
| Talcum | 17 |
| | 500 |

In the above procedure, an equal amount of L-5-hydroxytryptophan can be employed in place of L-tryptophan.

EXAMPLE 2

250 parts of L-tryptophan, 100 parts of L-3-(3,4-dihydroxyphenyl)-alanine, 25 parts of $N^1$-D,L-seryl-$N^2$-(2,3,4-trihydroxybenzyl)-hydrazide hydrochloride, 5 parts of citric acid and 105 parts of microcrystalline cellulose are mixed until homogenous then seived. The resulting powder mixture is well moistened with 600 parts of a 10% maise starch glue and subsequently granulated, dried and sieved again. The resulting granulate is mixed with 5 parts of magnesium stearate, homogenized and pressed into tablets having a weight of 500 mg. Each tablet has the following composition:

| | Mg. |
|---|---|
| L-tryptophan | 250 |
| L-3-(3,4-dihydroxyphenyl)-alanine | 100 |
| $N^1$-D,L-seryl - $N^2$-(2,3,4 - trihydroxybenzyl)-hydrazide-hydrochloride | 25 |
| Citric acid | 5 |
| Microcrystalline cellulose | 105 |
| Maize starch | 60 |
| Magnesium stearate | 5 |
| | 500 |

In the above procedure, an equal amount of L-5-hydroxytryptophan can be used in place of L-tryptophan.

EXAMPLE 3

Tablets having the following composition:

| | Mg. |
|---|---|
| L-tryptophan | 300 |
| L-3-(3,4-dihydroxyphenyl)-alanine | 40 |
| $N^1$-D,L-seryl - $N^2$-(2,3,4 - trihydroxybenzyl)-hydrazide-hydrochloride | 10 |
| Citric acid | 5 |
| Microcrystalline cellulose | 130 |
| Maize starch | 60 |
| | 550 | are prepared in the same manner as those in Example 2. An equal amount of L-5-hydroxytryptophan can be employed in place of L-tryptophan.

The following examples illustrate the results of clinical trials carried out in accordance with this invention.

EXAMPLE 4

A 60 year old female whose father and one sister had died from Parkinson's disease developed strong passive tremors in her right hand 8 years ago (1963). Upon examination it was discovered that along with the strong passive tremors in the right hand an extensively pronounced rigor (akinesia) in both upper extremities existed. The akinesia gave a disability score of 40. The disability score is evolved as follows:

10 functions are tested: walking, pushing, jumping, speech, writing, stopping, miming, associated movement, start and balance.

In the case of complete disability in any function, 10 points are awarded. A normal function is noted as 0. Intermediate disability in any function is given an intermediate score. The total sum gives a wide spectrum of motoric efficiency.

The patient was given three 125 mg. oral doses of L-dopa daily in the first and second week, three 250 mg. oral doses daily in the third and fourth week and three 500 mg. oral doses daily in the 5th–8th week. The disability had decreased by 20 after the 8th week. For a further increase in the kinetic effect she was in the 9th week given daily 2 capsules each containing 50 mg. of $N^1$-D,L-seryl-$N^2$-(2,3,4-trihydroxybenzyl) - hydrazine and 200 mg. of L-dopa.

In the 9th week an exceptional psychic condition occurred. The patient secluded herself from the environment, prepared her funeral dress, had Extreme Unction administered and did not eat. She was hospitalized because she was alone in her house and the neighbors were anxious for her. In the hospital she was disorientated regarding time and place, although she knew the attendant doctor and enthusiastically demonstrated her reacquired mobility. Minutes after such lucid, rational behavior she was completely perplexed and her thought completion was incoherent ("all incidents had a definite significance"). She expressed religious delusions and paranoid referential ideas which she uttered without pause. After such activities she abruptly halted and was stuporous. This behavior was maintained for several hours. The inhibited behavior was followed by a delirious unrest and bed fugues. When attempts were made to stop her she became aggressive. The patient was then given Distraneurin (chlorethiazol ethanedisulfonate) infusions without success. Eventually 500 mg. of L-tryptophan combined with 125 mg. of $N^1$-D,L-seryl-$N^2$-(2,3,4-trihydroxy benzyl)-hydrazide were administered orally three times daily. After 1 week the patient was completely quiet, fully oriented and cheerful. She was completely adapted in occupational therapy and in the ward gave the impression of being completely balanced. Since the tremor and the akinesia had become strong again in the second week without L-dopa therapy, she was given orally in the following 4 weeks a combination twice daily of 50 mg. of $N^1$-D,L-seryl-$N^2$-(2,3,4-trihydroxybenzyl)-hydrazide, 200 mg. of L-dopa and 500 mg. of L-tryptophan. The disability score returned once again to 15 after 2 weeks of this combination therapy. She was able to perform all functions of her daily life, including gardening, without difficulties. She was psychically brighter, balanced and her spirit seemed somewhat uplifted. She had complete amnesia for the 4 weeks of psychotic transit syndrome.

EXAMPLE 5

A 72 year old male pensioner had two endogenous depressive phases 6 years ago (1965) and had been treated successfully with amitriptyline. 2 years after the depressive phases a tremor appeared in both his hands and a weakness in his legs. These Parkinsonism symptoms became stronger in the following years until substantial disability occurred, e.g. he had a disability score of 65, i.e. the patient could only move with considerable effort and required assistance with all functions of his daily life such as eating, dressing and body care. Beginning Oct. 1969 he was given 0.5 g. of L-dopa 3 times each day orally. Tolerance of the drug was good. His disability score after 4 months of this treatment totalled 50, i.e., he could move without assistance and his speech was again loud and clear. An increase of the dose of L-dopa was not tolerated as evidenced by circulation problems i.e. threatening states of collapse were observed with lowering of the systolic blood pressure to values under 100. The patient was admitted to the hospital in view of his general weakness and increase in akinesia. His ECG showed slight myocardial damage, but the usual internal examinations revealed findings which were in the region of the norm. During an influenza infection his disability score increased to 80, i.e. he could no longer move at all nor swallow or speak. In order to neutralize this akinetic crisis, the patient was given daily infusions of 50 mg. of L-dopa together with 0.25 mg. of strophanthin and, at the same time, 2 capsules, each containing 50 mg. of $N^1$-D,L-seryl-$N^2$-(2,3,4-trihydroxybenzyl) - hydrazide and 200 mg. of L-dopa, were administered orally. After 1 week of such treatment mobility was better (disability score 50), but the patient was psychially eccentric. He was completely disorientated regarding time and place and also autopsychially; did not recognize his wife, became bed fugitive, ran around the whole department, entered strange wards and looked for a man who "threatened him with death." In addition to his bewilderment and the motoric agitation, his anxious state of mind was most striking. The L-dopa administration was thereupon discontinued for 4 weeks, with the result that while the psychic transit syndrome disappeared, the patient again became completely akinetic. The L-dopa administration therefore had to be resumed but after 3 days of treatment the same psychic decompensation reappeared. The L-dopa medication, i.e. 250 mg. daily, was then combined twice daily with 500 mg. of L-tryptophan. After 1 week of the combined treatment the patient was psychially completely settled, slept normally and his disability score totalled 55, i.e. he could walk slowly, dress himself, speak and eat alone. This therapy with the combination of L-dopa and L-tryptophan was continued for 3 months. During this time no psychic incidents occurred and the motoric disability score fell to between 45 and 55.

EXAMPLE 6

A 59 year old male pensioner began having Parkinson syndrome in 1961 with tremor in the left hand. After a stereotactic operation with elimination of the right ventro oralis nucleus he was sent home (1961) without any complaints. Some time later the tremor began in the right hand, whereupon in 1964 a sterotactic operation on the left was carried out. The tremor became better, but from that time he could no longer speak and had to retire. His condition subsequently markedly deteriorated. In June 1970 he could no longer talk at all, i.e. a complete aphony existed. His writing was illegible, his posture was bent forward almost at a right angle, and he also had a pronounced starting-restriction when walking; alone he could no longer walk at all (disability score 70). He was given daily 250 mg. of $N^1$-D,L-seryl-$N^2$-(2,3,4-trihydroxybenzyl)-hydrazide in combination with 1500 mg. of L-dopa orally. The kinetic effect as a result of such treatment was considerable. After 4 months, the disability score totalled 15, i.e. he was practically healthy. After 6 months' treatment, a nightly disturbance appeared. The patient wandered around the flat, looked for burglars and was unresponsive. If his wife tried to stop him wandering, he became aggressive. The daily dosage was therefore reduced to 50 mg. of $N^1$-D,L-seryl-$N^2$-(2,3,5-trihydroxybenzyl)-hydrazide in combination with 1200 mg. of L-dopa. After a further 4 weeks of treatment his disturbed state also occurred during the day necessitating his admission to the hospital. Clinically, he was in a disturbed state with disorientation regarding time and place and a motoric unrest in bed which were interrupted by fugue-phases in which he rushed around every floor of the hospital. During these phases he was non-responsive, always tried to free himself and also could not speak. His state of mind was anxiously strained and aggressive. He was then given orally 1500 mg. of L-tryptophan in combination iwth 250 mg. of $N^1$-D, L-seryl-$N^2$-(2,3,4-trihydroxybenzyl)-hydrazide. From then on he was quiet during the day, although his delirious nights remained. The dosage was thereupon increased to 3000 mg. of L-tryptophan. After a further week at this dosage he was motorically completely still, his state of consciousness was clear, his speech was normal and his orientation regarding time and place returned completely to normal and had no recollection of the delirious phase. He was then given a daily dosage of 100 mg. of $N^1$-D,L-seryl-$N^2$-(2,3,4-trihydroxybenzyl)-hydrazide, 400 mg. of L-dopa and 3000 mg. of L-tryptophan for 3 months. With this combination therapy he was psychically completely balanced, but slightly lethargic. His disability score totalled 20.

We claim:

1. A therapeutic composition for treating Parkinsonism comprising an effective anti-Parkinsonism amount of a composition containing as component (a) from about 0.5 to 5 parts by weight of L-tryptophan, L-5-hydroxytryptophan or equivalent amount of a pharmaceutically acceptable salt of either per part by weight of, as component (b), L-3-(3,4-dihydroxyphenyl) alanine or equivalent amount of a pharmaceutically acceptable salt thereof.

2. The composition of claim 1 wherein there is present as component (a) L-tryptophan or equivalent amount of a pharmaceutically acceptable salt thereof.

3. The composition of claim 1 wherein there is additionally present, as component (c), from about 0.1 to 1 part by weight of a peripheral decarboxylase inhibitor or equivalent weight of a pharmaceutically acceptable salt thereof per part by weight of component (b).

4. The composition of claim 3 wherein the peripheral decarboxylase inhibitor is $N^1$-D,L-seryl-$N^2$-(2,3,4-trihydroxybenzyl)-hydrazide or a pharmaceutically acceptable salt thereof.

5. The composition of claim 3 wherein the peripheral decarboxylase inhibitor is $N^1$-L-seryl-$N^2$-(2,3,4-trihydroxybenzyl)-hydrazide or a pharmaceutically acceptable salt thereof.

6. The composition of claim 2 wherein the peripheral decarboxylase inhibitor is $N^1$-glycyl-$N^2$-(2,3,4-trihydroxybenzyl)-hydrazide or a pharmaceutically acceptable salt thereof.

7. The composition of claim 3 wherein the peripheral decarboxylase inhibitor is $N^1$-D,L-tryrosyl-$N^2$-(2,3,4-trihydroxybenzyl)-hydrazide or a pharmaceutically acceptable salt thereof.

8. The composition of claim 3 wherein the peripheral decarboxylase inhibitor is $N_1$-D,L-tyrosyl-$N^2$-(2,3,4-trihydroxybenzyl)-hydrazide or a pharmaceutically acceptable salt thereof.

9. The composition of claim 3 wherein components (a) and (b) are coated with a pharmaceutically acceptable inert slow release gastric juice resistant coating which releases the components, upon oral administration, about 30–60 minutes after release of the peripheral decarboxylase inhibitor.

10. The composition of claim 3 containing about 10–30 parts by weight component (a) 2.5–7.5 parts by weight component (b) and 0.5–2.5 parts by weight component (c).

11. A method of treating Parkinsonism which comprises administering to a patient afflicted with that condition an effective dosage of, a combination containing about 0.5 to 5 parts by weight of L-tryptophan, L-5-hydroxytryptophan or equivalent amount of a pharmaceutically acceptable salt thereof per part by weight of L-3-(3,4-dihydroxyphenyl)alanine or equivalent amount of a pharmaceutically acceptable salt thereof.

12. The method of claim 11 wherein a peripheral decarboxylase inhibitor is administered about 30–60 minutes prior to said combination.

13. The method of claim 12 wherein the decarboxylase inhibitor is $N^1$-D,L-seryl-$N^2$-(2,3,4-trihydroxybenzyl)-hydrazide or a pharmaceutically acceptable salt thereof.

14. A method of treating and preventing the undesirable side effects of L-3-(3,4-dihydroxyphenyl)-alanine administration, to a patient afflicted with Parkinsonism comprising administreing to such patients an effective amount of L-tryptophan, L-5-hydroxytryptophan or a pharmaceutically acceptable salt of either in combination with L-3-(3,4-dihydroxyphenyl)-alanine or a pharmaceutically acceptable salt thereof.

References Cited
UNITED STATES PATENTS
3,701,829   10/1972   Bartholini _____ 424—319

STANLEY, J. FRIEDMAN, Primary Examiner

U.S. Cl. X.R.
424—319